Patented Feb. 7, 1933

1,896,945

UNITED STATES PATENT OFFICE

WALTER FRIEDERICH, OF TROISDORF, GERMANY

PROCESS OF MANUFACTURING NITROUS OXIDE

No Drawing. Application filed February 4, 1929, Serial No. 337,530, and in Germany April 27, 1928.

In the German Patent-Specifications No. 71 279 and 276 069 processes are described relating to the manufacture of nitrous oxide from ammonium nitrate or from a mixture of ammonium sulfate and sodium or potassium nitrate. These processes have the drawback, that the decomposition of ammonium nitrate according to the equation $NH_4NO_3 = N_2O + 2H_2O$ is accompanied by secondary reactions, by which nitrogen as well as nitrous oxide and other nitric oxides, $NO$, $N_2O_3$, $NO_2$, are produced. Furthermore by partial dissociation, free nitric acid is produced. The nitric oxides and the nitric acid are corroding the material of the jar and the production of nitrous oxides is reduced more and more and finally decrepitations may be caused by the decomposition. The nitric oxides contained in the mixture require purification of the nitrous oxide.

Now I have found that these drawbacks may be avoided by the admixture of a small amount of ammonia to the ammonium nitrate or to the mixture of ammonium sulfate and sodium or potassium nitrate. This amount of ammonia may be added either in gaseous form and is then bubbled through the reaction mass or as a constituent of a solution of ammonium nitrate which is to be used. By this addition of a small amount of ammonia the formation of nitric oxide, nitrogen dioxide and free nitric acid is considerably reduced or if there is enough ammonia is entirely avoided and the reaction mass is kept neutral or slightly ammoniacal. The output of nitrous oxide is greatly increased. Besides nitrous oxide and water only a very small amount of nitrogen is produced. By adding about 0.7 to 1.4 parts of $NH_3$ to 100 parts of ammonium nitrate it is easy to realize an output of 96–98% of the theoretical estimate. In addition to this improvement of the output the further advantage is attained that the material of the jar is not at all or very slightly corroded, and especially the danger of decrepitations and explosions are avoided. The purification of the nitrous oxide becomes a very simple process in consequence of the absence of the nitric oxide and nitrogen dioxide.

The reaction jars are suitably made of acid proof alloys like stainless steel or enamelled material.

The starting materials being either nitrate of ammonium or sulphate of ammonium and nitrate of potassium or sodium, their reaction produces nitrate of ammonium and the sulfate of potassium and sodium.

The nitrate of ammonium may preferably be filled into the reaction jar as an aqueous solution, so that the process may be made continually in this way. It is very advantageous first to fill the reaction jar with a solution or admixture of salts such as an admixture of sodium or potassium nitrate. The reaction jar may be heated electrically or by a gas burner.

The reaction takes place at about 200° to 240° C. At this temperature, the water of the aqueous solution of ammonium nitrate evaporates very quickly, and a molten mixture is then obtained of the different salts with only a very small amount of water and ammonia dissolved. The purpose of the admixture of the different salts is to diminish the possibility of decrepitations.

What I claim as new and my invention and desire to secure by United States Letters Patent is:

1. A process of manufacturing nitrous oxide out of nitrate of ammonium by heating it to between 220° and 240° C. in the presence of a small amount of ammonia by adding a concentrated aqueous solution of nitrate of ammonium, containing a small amount of free ammonia in the same proportion as the nitrate of ammonium is decomposed.

2. A process of manufacturing nitrous oxide out of nitrate of ammonium by flowing a concentrated aqueous solution of nitrate of ammonium, containing a small amount of free ammonia in a molten mixture of nitrate of potassium and nitrate of ammonium heated to between 220 and 240° C. in the same proportion as the nitrate of ammonium is decomposed.

3. A process of manufacturing nitrous oxide out of nitrate of ammonium by flowing a concentrated aqueous solution of nitrate of ammonium, containing a small amount of free ammonia in a molten mixture of nitrate of sodium and nitrate of ammonium heated to between 220 and 240° C. in the same proportion as the nitrate of ammonium is decomposed.

4. A process of manufacturing nitrous oxide out of nitrate of ammonium by flowing a concentrated aqueous solution of nitrate of ammonium, containing a small amount of free ammonia in a molten mixture of nitrate of potassium, nitrate of sodium and nitrate of ammonium heated to between 220° and 240° C. in the same proportion as the nitrate of ammonium is decomposed.

5. A process of manufacturing nitrous oxide out of nitrate of ammonium by flowing a concentrated aqueous solution of nitrate of ammonium, containing a small amount of free ammonia into a mixture of indifferent salts selected from a group consisting of nitrate of potassium, nitrate of sodium, nitrate of ammonium, ammonium sulfate, potassium sulfate, and sodium sulfate heated to between 220 and 240° C. in the same proportion as the nitrate of ammonium is decomposed.

In testimony whereof I have affixed my signature.

WALTER FRIEDERICH.